United States Patent [19]
Journee et al.

[11] Patent Number: 5,255,702
[45] Date of Patent: Oct. 26, 1993

[54] VENTING SYSTEM FOR A FUEL TANK

[75] Inventors: Maurice Journee, Reilly; Pierre-André Hyernard, Paris; Christian Romanek, Noailles, all of France

[73] Assignee: Paul Journee S.A., Colombes Cedex, France

[21] Appl. No.: 702,373

[22] Filed: May 20, 1991

[30] Foreign Application Priority Data

May 23, 1990 [FR] France ................... 90 06434

[51] Int. Cl.$^5$ .............................................. F16K 24/00
[52] U.S. Cl. ................................... 137/202; 137/588; 220/746
[58] Field of Search ............... 137/43, 202, 587, 588; 220/746, 749

[56] References Cited

U.S. PATENT DOCUMENTS

| | | | |
|---|---|---|---|
| 4,000,828 | 1/1977 | Crute | 137/43 X |
| 4,742,809 | 5/1988 | Ito et al. | |
| 4,893,643 | 1/1990 | Gifford | 137/588 X |
| 4,974,645 | 12/1990 | Johnson | 137/587 X |
| 5,004,002 | 4/1991 | Kobayashi | 137/43 X |

FOREIGN PATENT DOCUMENTS

| | | |
|---|---|---|
| 0254631 | 1/1988 | European Pat. Off. |
| 0336788 | 10/1989 | European Pat. Off. |
| 3605708 | 10/1986 | Fed. Rep. of Germany |
| 2221938 | 10/1974 | France |
| 2593752 | 8/1987 | France |
| 2606856 | 5/1988 | France |

*Primary Examiner*—Robert G. Nilson
*Attorney, Agent, or Firm*—Dennison, Meserole, Pollack & Scheiner

[57] ABSTRACT

A venting system for a motor vehicle fuel tank comprises a fuel tank having a filling pipe, an overflow duct, a gas vent duct, a safety valve; fresh air duct for removal of excess fuel vapour from the fuel tank through the fresh air duct. A scavenging duct and an auxiliary valve for overcoming failure of the scavenging duct and/or of the safety valve, in order to ensure that the fuel tank is vented through the fresh air duct are also provided.

1 Claim, 10 Drawing Sheets

VENTING SYSTEM FOR A FUEL TANK

FIELD OF THE INVENTION

This invention relates to a venting system for a fuel tank, in particular a fuel tank for a motor vehicle.

BACKGROUND OF THE INVENTION

The specification of the French published patent application FR 2 593 752A discloses a system which comprises a fuel tank having a filling pipe, a first conduit referred to as an overflow duct, a second conduit referred to as a gas vent duct, and a third conduit referred to as a fresh air duct. The filling pipe terminates in an orifice with a fuel cap for covering the orifice so as to close the pipe when not in use for filling purposes.

The overflow duct extends from the interior of the fuel tank, and terminates at the level of the upper part of the filling pipe, and its purpose is to evacuate any excess fuel from the fuel tank towards the filling pipe. The gas vent duct extends from the top of the fuel tank, and again terminates at the level of the upper part of the filling, pipe. The gas vent duct is required in order to permit all the necessary variations to take place in the volume of residual air present in the upper part of the tank; it also serves to accommodate any possible surges of fuel. The gas vent duct is able to be in communication with the filling pipe after the filling orifice has been closed with the fuel cap.

The fresh air duct is the external venting means whereby any build up of fuel vapour in the system can be allowed to escape to the atmosphere outside the vehicle. This may typically occur for example during refuelling. By the same token there may be an excess of pressure (over-pressure) in the fuel tank or in the system, due to increase in the volume of fuel in the tank and the consequent presence of fuel vapours and reduction in the volume within the tank available for accommodation of air in the latter. Thus the purpose of the fresh air duct is either to vent the tank so as to allow vapours and over-pressures of air to escape, or to correct any under-pressure resulting from consumption of the fuel while the vehicle is running, by admitting free air from outside into the tank through the fresh air duct itself.

The specification of European published patent application No. EP 0 336 788A discloses the provision of a safety valve between the gas vent duct and the fresh air vent, with a view to preventing any fuel from escaping from the fuel tank. Such escape of fuel may be caused by jolting in the vehicle or by the positioning of the vehicle on a steep slope (for example when stationary); or even by the vehicle being turned upside down in a accident.

This safety valve comprises a valve member which is adapted to close an outlet, by means of either a float which is actuated by the fuel itself, or a biassing means which is responsive to the inclination of the vehicle or to accelerations or decelerations of the vehicle. Such a biassing means may for example comprise either a ball which is mounted between inclined ramps, or a calibrated spring.

As described in the above mentioned European patent specification, the safety valve may be used in association with a fourth duct, referred to as a scavenging (or de-pollution) duct. Such a scavenging duct is described more fully in the specification of U.S. Pat. No. 4,742,809, and serves to separate the air from the fuel vapours by condensing the latter so that they can then return in liquid form to the fuel tank: the scavenging duct is however so arranged that clean air can still escape to the outside.

The present Applicant has found however that these various known arrangements have a number of drawbacks. In particular, in the situation in which the valve member of the safety valve is immobilised in a position in which it obstructs or closes the outlet orifice of the safety valve, any excess or deficiency in pressure that may arise is unable to be corrected, and any fuel vapour that may be present in the interior of the fuel tank is unable to be evacuated, by passage of air into the system through the said outlet orifice, or by passage of air and/or vapour from the interior to the outside via the same orifice, as the case may be.

In addition, if the scavenging duct is obstructed by some impurity, the fuel vapours are unable to be conveyed to the scavenging system, and are therefore liable to set up an excess of pressure in the fuel tank which is then unable to be corrected.

OBJECTS OF THE INVENTION

An object of the present invention is to overcome the disadvantages mentioned above, by providing a venting system for a fuel tank which is of very simple design and which avoids the possible effects of any malfunction.

SUMMARY OF THE INVENTION

According to the present invention, a venting system for a fuel tank, especially for motor vehicles, comprises a filling pipe, an overflow duct, a gas vent duct, a fresh air duct, a safety valve, and (optionally) a scavenging duct, and an auxiliary valve is provided for overcoming failure of the scavenging duct and/or of the safety valve., in order to ensure that the fuel tank is vented through the fresh air duct.

The provision of the auxiliary valve in the system according to the invention enables fresh air to be passed into the fuel tank whenever required, and thus ensures that any over-pressures or under-pressures in the fuel tank can be corrected.

The other features and advantages of the invention will appear more clearly from the following description, which is given by way of example only and with reference to the accompanying drawings.

DESCRIPTION OF PREFERRED EMBODIMENTS OF THE INVENTION

Figure 1:
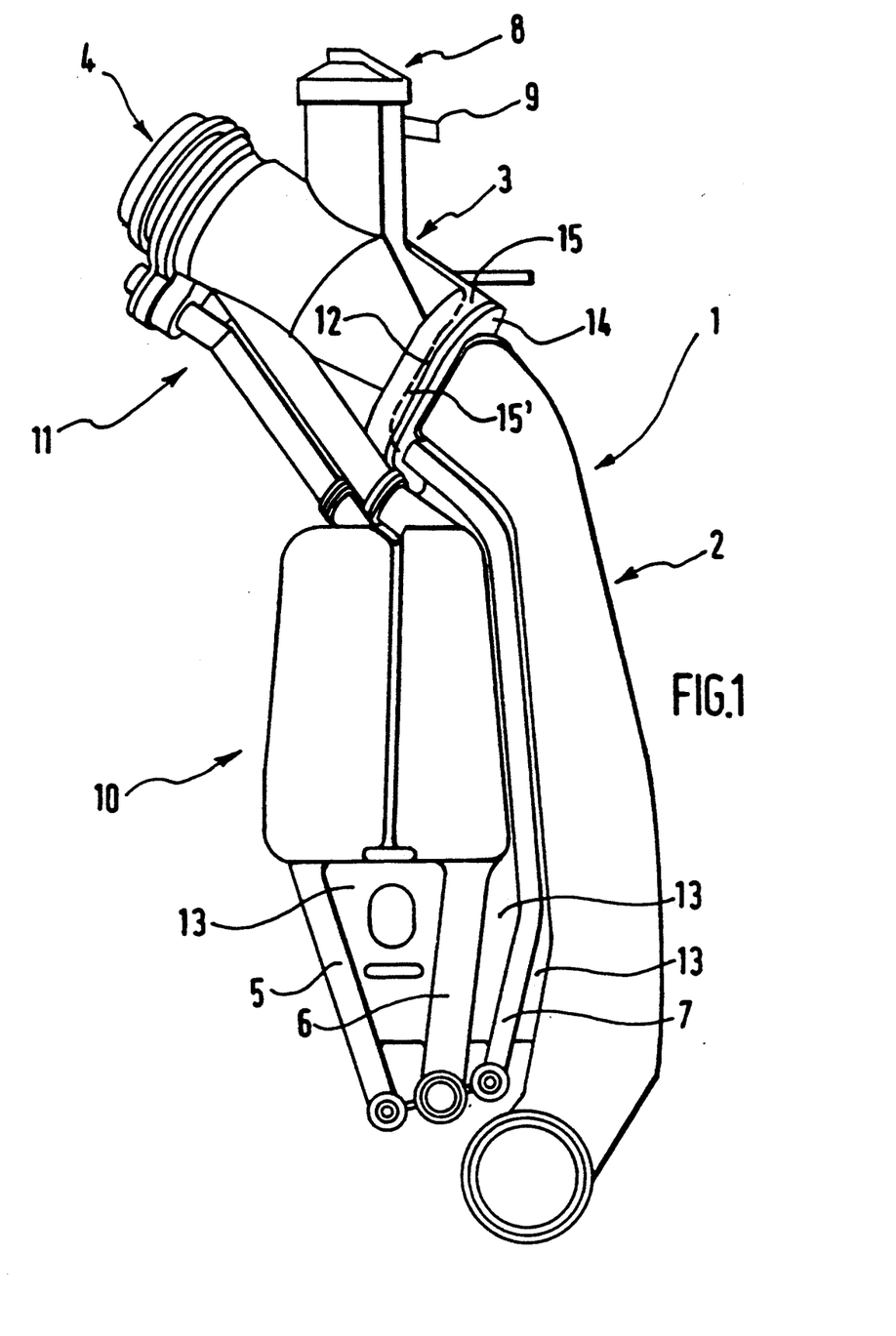
FIG. 1 shows diagrammatically the filling pipe and its various ducts, together with the safety valve.

Reference will first be made to FIG. 1, which shows a filling system 1 comprising a tubular filling pipe 2 having at its upper end a pipe mouth 3, which is also of tubular shape and which has a circular opening 4 adapted to receive a closure cap, not shown. The filling pipe 2 has a lower end which is connected to a fuel tank (not shown).

A first conduit 5 leads upwardly from the fuel tank. The conduit 5 is an overflow duct which terminates at the level of the upper end of the pipe mouth 3. A second conduit 6, which is a gas vent duct, also extends from the fuel tank, up to substantially the same level as the overflow duct. A third conduit 7, which is a scavenging duct, extends from a scavenging or depolluting system and terminates at the level of a safety valve 8. Finally, a fourth conduit 9, namely a fresh air duct, is carried in the example shown in FIG. 1 by the safety valve 8, though it may be carried by the pipe mouth 3 instead.

The ducts 5, 6 and 9 and the safety valve 8 associated with the duct 7 provide ventilation for the fuel tank via the pipe 2 and its pipe mouth 3. As is best seen in FIG. 1, the filling device, constructed as just described, is formed in two parts, namely a lower part 10 (which will be referred to as the filling body) and an upper part 11 (which will be called the filling head). To this end, these two parts 10 and 11 are permanently joined to each other along a junction plane 12.

In this way, the body 10 of the filling system 1 includes the lower parts of the overflow duct 5, gas vent duct 6, fresh air duct 9 and filling pipe 2, with these various ducts and the filling pipe being joined to each other through webs 13, so as to form a monobloc assembly extending up to the junction plane 12.

The head 11 of the filling system 1 includes the pipe mouth 3 and the upper parts of the overflow duct 5, gas vent duct 6, fresh air duct 9 and scavenging duct 7, together with the safety valve 8. These various elements are made integrally with each other, for example by moulding a suitable plastics material.

The filling body 10 has a base portion 14 and the filling head 11 has a base portion 15. These base portions 14 and 15 are mounted in abutting relationship so as to join the filling head and filling body permanently together. The base portion 15 has, within its thickness, a passage 15' which brings the upper and lower parts of the scavenging duct 7 into communication with each other.

Figure 2:
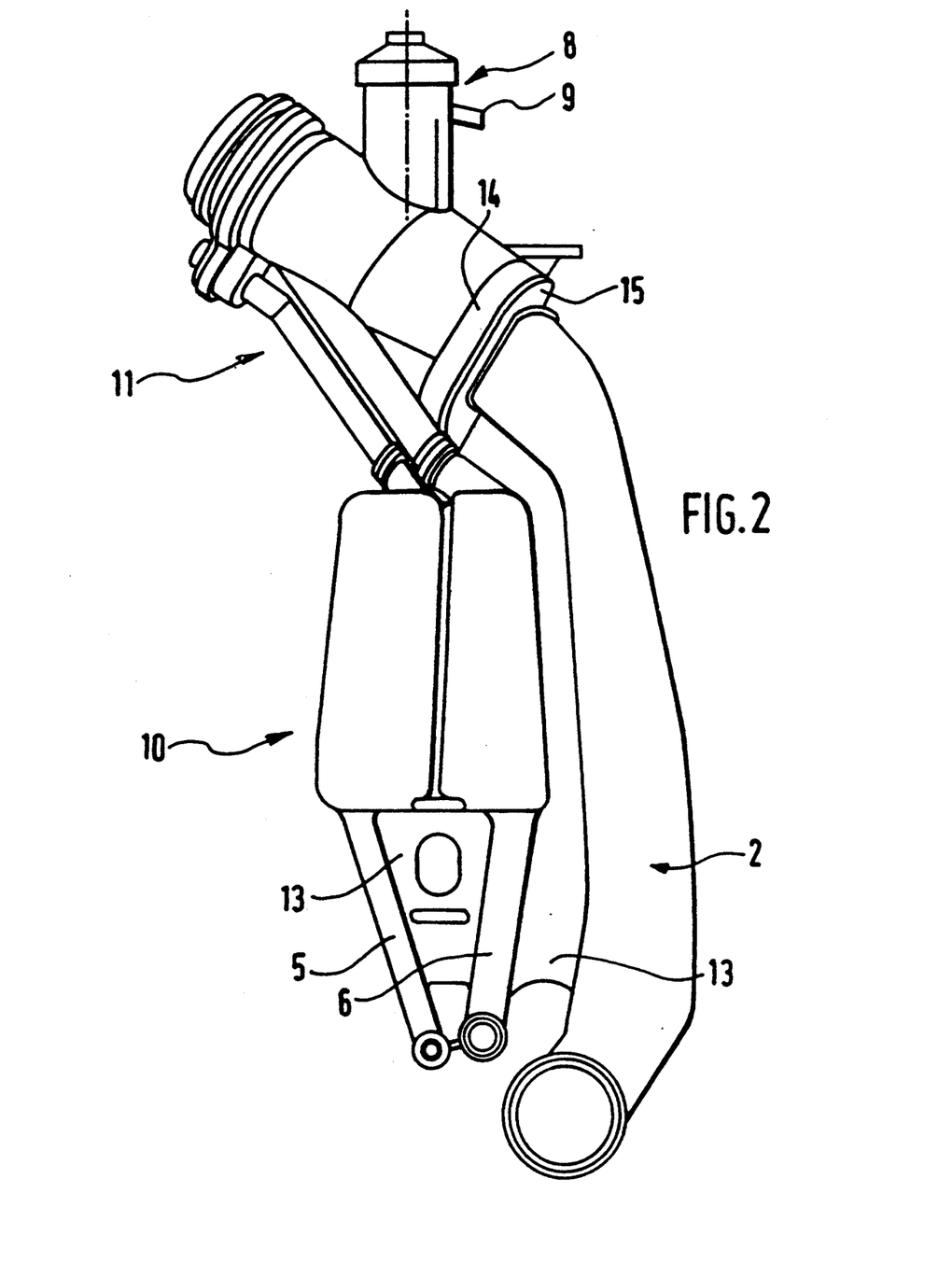
FIG. 2 also shows a filling pipe with its various ducts, apart from the scavenging duct.

Reference will now be made to FIG. 2, which illustrates a modified form of the filling system of FIG. 1. In the system shown in FIG. 2, the scavenging duct 7 is absent. As has already been described in relation to FIG. 1, the filling system has a filling body 10, which again has the overflow duct 5, the gas vent duct 6 and a filling pipe 2, these three components being joined to each other through a web 13 so as to constitute a monobloc unit.

The filling head 11 includes the safety valve 8, the upper parts of the overflow duct 5 and gas vent duct 6, and the fresh air duct 9. The filling body 10 and filling head 11 are again provided with fastening base portions 14 and 15 for securing the parts 10 and 11 permanently together.

The fuel tank is vented through the filling pipe 2, its pipe mouth 3, the ducts 5, 6 and 9, and the safety valve 8.

Figures 3, 4:
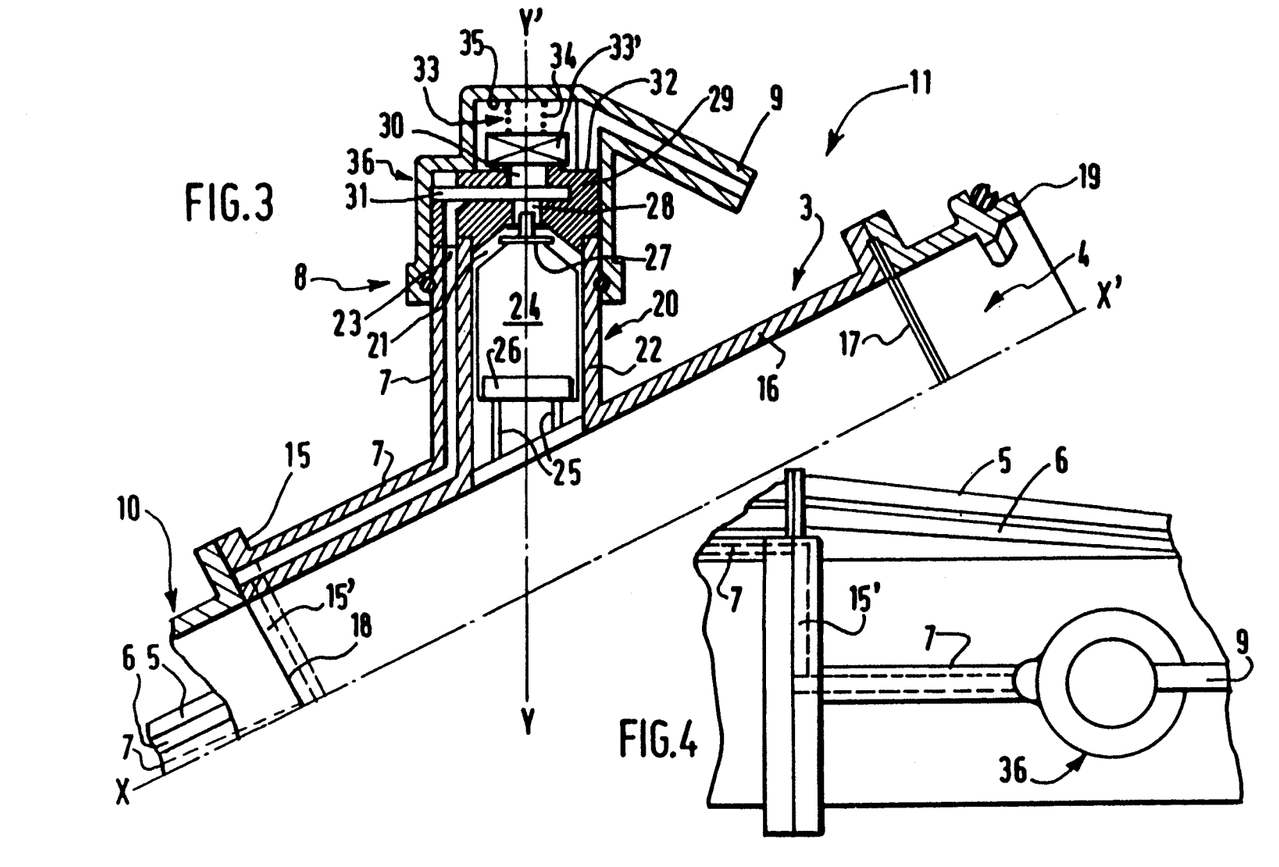
FIG. 3 is a view in cross section, showing part of the filling pipe in relation to FIG. 1, and having a venting device in accordance with the invention.
FIG. 4 is a top plan view on FIG. 3.

Reference is now made to FIGS. 3 and 4, which show the filling head 11 in detail, and more particularly that part of it which comprises the safety valve 8. In FIGS. 3 and 4, the pipe mouth 3 of the filling head 11 comprises a circular wall 16 having open ends 17 and 18 and defining a hollow, open ended cylinder. In abutment on the end 17 of this cylinder is a fastening base 19, on to which the filler cap (not shown), for closing the space 4 in the fastening base 19, can be secured. The open end 18 of the hollow cylinder of the pipe mouth 3 includes the base portion 15 described above. The passage 15' in the base portion 15 is also seen in FIGS. 3 and 4. Abutting on the open end 18 is the filling body 10 of the filling system, so that there is a continuous passage through the two components thus joined together and between the lower parts of the ducts 5, 6 and 7 and their upper parts.

The safety valve 8 extends upwards from the wall 16, with its axis YY' making an angle other than zero with the general axis XX' of the filling head 11. The safety valve a comprises a cylindrical neck portion 20 which is open at its lower end into the hollow space within the cylindrical wall 16 of the pipe mouth 3. At the upper end of the neck portion 20 is an opening 21.

The upper part of the scavenging duct 7 is formed integrally along the interior of the wall 16, and extends along the outer wall 22 of the neck portion 20 to terminate in an open end 23, at the same level as the opening 21 of the neck portion 20. The other end of the upper part of the duct 7 extends towards the base portion 15 to communicate with its lower portion.

As has already been described in European published patent specification No. EP 0 336 788A and the corresponding French published patent specification No. FR 2 628 368A, an obturating or valve member 24 is arranged within the neck portion 20, to lie on end stop elements 25 which are arranged close to the intersection between the neck portion 20 and the cylindrical wall 16 of the pipe mouth 3, in such a way as to prevent any possible fall of the obturating member 24 into the hollow interior of the filling head 11.

The obturating member 24 has a float 26 and a valve surface 27 which is arranged for closing an orifice 28 which is formed in a seating member 29.

In a variant within the scope of the invention, the obturating member 24 may be controlled only by a suitable biassing means, for example a ball mounted on ramps or a calibrated spring.

The seating member 29 is arranged concentrically with the neck portion 20, and overlies the opening 21 of the latter and the open end 23 of the scavenging duct 7. Within the body of the seating member 29, the orifice 28 is arranged so as to be concentric with the float 26. The seating member also has a second orifice 30, concentric with the orifice 28, together with an escape passage 31, which brings the orifice 26 or the orifice 30 into communication with the scavenging duct 7 through the open end 23 of the latter. From the face 32 of the seating member 29 opposite to the face of the latter that overlies the openings 21 and 23, an auxiliary valve 33 is fitted. The auxiliary valve 33 comprises a valve member 33' which can be calibrated so as to be responsive to over-pressure or under-pressure by means of a spring 34. The details of this element 33' can be similar to the embodiment shown in FIGS. 12 and 13 in which we have elements 72, 73 responsive to both over-pressure and under-pressure. The valve 33 is trapped between the upper face 32 of the seating member 29 and the base 35 of a cap 36, which surrounds and overlies the seating member 29 and part of the neck portion 20. The cap 36 is joined to the seating member 29 and neck portion 26 sealingly and in a non-removable manner. The cap 36 has a fresh air duct extending from its periphery. In this example, the fresh air duct is the duct 9, which brings the space defined by the base 35 of the cap 36, and the upper face 32 of the seating member 29, into communication with the atmosphere.

The fuel tank venting system shown in FIGS. 3 and 4 operates as follows. With a fuel cap secured over the opening 4, if any fuel rises up into the interior of the pipe mouth 3, then this liquid comes into contact with the float 26 so that the obturating or valve member 24 moves upward in a straight line along the axis YY' of the safety valve 8 so as to close off the orifice 28, thus preventing any liquid from entering the scavenging duct 7.

In the event of an under-pressure or over-pressure arising within the fuel tank, air is admitted to the tank, or released from it, via the duct 7, the passage 31 and the orifice 28 of the safety valve 8. In the same way, vapour build-up in the fuel tank is prevented by release of volatile gases or vapour from the fuel by the same route.

In the event of the scavenging duct 7 being blocked by some impurity, with an over-pressure or under-pressure existing within the pipe mouth 3, the float 26 is in engagement on the end stop elements 25, so that the orifice 28 is open. The pressure cannot be corrected by evacuation of air or admission of fresh air from the outside through the duct 7, while also fuel vapour cannot be evacuated via the duct 7. For this reason, the pressure within the fuel tank will become elevated, and these effects can cause serious damage to the fuel tank.

Under these circumstances, the valve member 33' of the auxiliary valve 33 opens, thus opening the orifice 30. Fresh air from the outside can then flow through the fresh air duct 9, the orifice 30 and the orifice 26, so as to bring the interior of the pipe mouth 3 into communication with the atmosphere. In this way the excess pressure in the fuel tank is removed, or the deficiency in pressure is corrected as the case may be, and any vapour in the tank is allowed to escape.

Figures 5, 6:
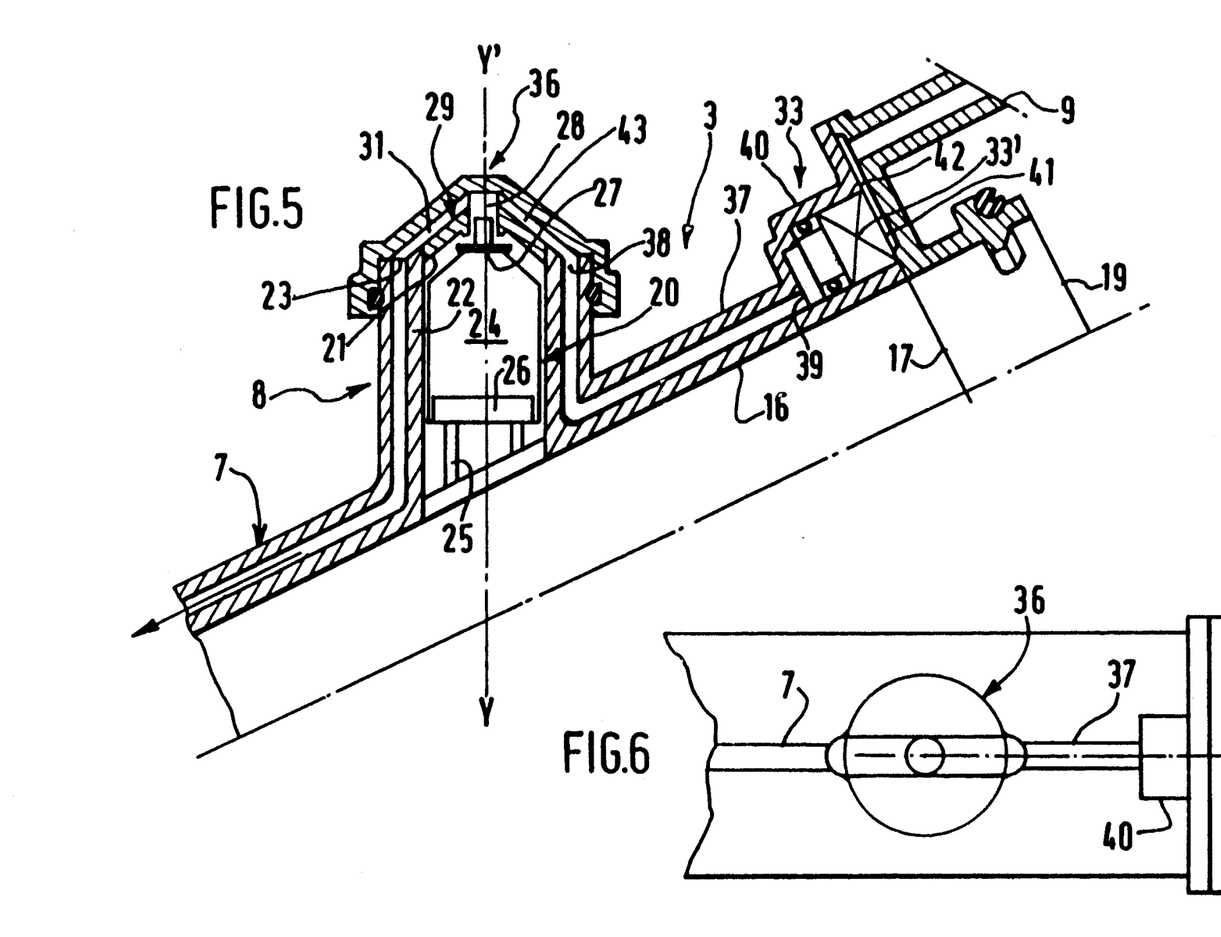
FIG. 5 is a view in cross section showing part of the filling pipe with a venting device in a second embodiment of the invention, being a first variant on that shown in FIG. 3.
FIG. 6 is a plan view on FIG. 5.

Reference is now made to FIGS. 5 and 6. In these Figures, the same essential elements are present as those in FIGS. 3 and 4, and are indicated by the same reference numerals. As has already been described, the pipe mouth 3 includes the safety valve 8 having its neck portion 20 with an open end 21, together with a scavenging duct 7 running along the pipe mouth 3 and neck portion 20 to terminate in an open end 23. The valve member 24 is again arranged inside the neck portion 20, to bear on the end stop elements 25, with the valve member 24 having the float 26 and valve surface 27 for cooperation with the orifice 28 of the seating member 29, together with the escape passage 31 connecting the orifice 28 with the open end 23 of the scavenging duct 7.

However, in the arrangement shown in FIGS. 5 and 6, a supplementary duct 37 is formed integrally in the wall 16. The duct 37 has a first portion extending along the wall 16, and a second portion extending along the outer wall 22 of the neck portion 20, to terminate in an open end 38 at the same level as the opening 21 of the neck portion 20. The duct 37 is arranged symmetrically with the scavenging duct 7, with reference to the axis YY' of the safety valve 8.

The other end 39 of the supplementary duct 37 is open into an auxiliary valve 33, which has a valve member 33' that operates, as before, in the event of an over-pressure or under-pressure. The auxiliary valve 33 has a housing 40 which is substantially cylindrical in shape and which is also formed integrally with the wall 16. One end of the housing 14 is in communication with the open end 37 of the supplementary duct 37, and its other end 41 lies in the same plane as the open end 17 of the pipe mouth 3. The fastening base 19, already described with reference to FIG. 3, overlies the open end 17 and the open end 41 of the pipe mouth 3 and auxiliary valve housing 40 respectively. However, in this example the fastening base 19 carries the fresh air duct, which here comprises a fresh air duct 9 that is open into a communication passage 42, which brings the fresh air duct 9 into communication with the auxiliary valve 33.

A cap 36 is again mounted securely and sealingly over the open end 21 of the neck portion 20 of the safety valve 8. In this case the orifice 28 is formed in the body of the cap 36, with the latter also serving as the seating element 29 for the valve member 24. The orifice 28 is in communication with the scavenging duct 7 through the escape passage 31, and with the supplementary duct 37 through an additional communication passage 43.

The operation of this auxiliary valve and safety valve is substantially identical with that already described with reference to FIGS. 3 and 4. Thus the valve member 24 closes the orifice 28 in the event of a surge of fuel into the interior of the pipe mouth 3, while also depolluting or devaporising the fuel tank by scavenging excess gas from the latter and correcting any over-pressure or under-pressure in the tank via the scavenging duct 7.

However, in the embodiment shown in FIGS. 5 and 6, if the scavenging duct 7 is obstructed by some impurity, the admission or release of air from or to the outside atmosphere, in order to correct the pressure in the fuel tank and to scavenge vapour from the latter, takes place through the fresh air duct 9, the valve 33, the supplementary duct 37, the communication passage 43, the orifice 28 and the interior of the pipe mouth 3.

Reference will now be made to FIGS. 7 and 8, which again include the same essential elements as those in the embodiments already described, and which again accordingly carry the same reference numerals. In this third embodiment, the pipe mouth 3 has the neck portion 20 as already described, and the valve member 24 is again present with its float 26 and valve surface 27, and with the upper part of the scavenging duct 7 running along the wall 16 of the pipe mouth 3 and along the wall 22 of the neck portion 20, to terminate in an open end 23.

Figures 7, 8:
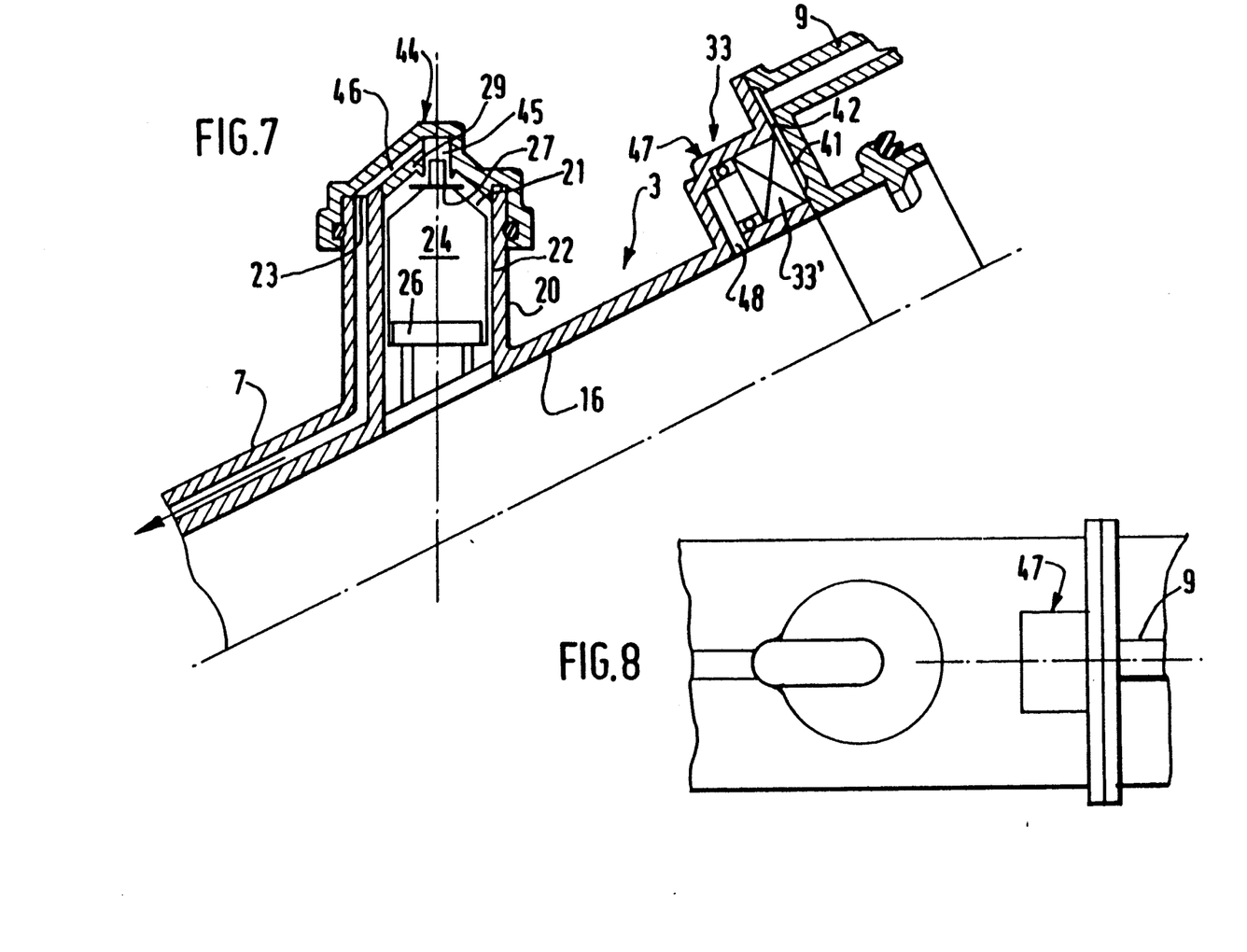
FIG. 7 is a view in cross section showing part of the filling pipe with a venting device in a third embodiment of the invention, being a second variant on the version shown in FIG. 3.
FIG. 8 is a top plan view on FIG. 7.

However, in this embodiment, the seating member 29 of the safety valve 8 is in the form of a cap 44 which is secured sealingly over the opening 21 and the open end 23 of the duct 7. The cap 44 has in its base an orifice 45 which is blind at one end and which is concentric with the valve member 24. The orifice 45 communicates close to its blind end with a passage 46, which connects the open end 23 of the scavenging duct 7 with the orifice 45. The other end of the orifice 45 is open towards the valve member 24.

The auxiliary valve 33 includes a valve member 33', which is again made responsive to over-pressure and under-pressure, and which is mounted in a housing 47, generally cylindrical in shape and having at one of its ends a communication passage 48 leading into the interior of the pipe mouth 3. At its other end, the housing 47 has an opening 41 which is arranged as already described with reference to FIG. 5, in communication with the fresh air duct 9 through a communication passage 42.

The arrangement shown in FIGS. 7 and 8 operates as follows. In the event of over-pressure or under-pressure occurring in the fuel tank, or in the event of any possible surges of fuel towards the space 4 in the fastening base 19, the valve member 24 operates in the same way as has already been described.

In the event of the valve member 24, and more particularly its valve surface 27, becoming seated against the orifice 45, so as to close the latter and thus prevent any possible communication between the scavenging duct 7 and the interior of the valve mouth 3: or in the event of the scavenging duct 7 becoming blocked, then the excess pressure or under-pressure, and/or the gas vapours in the tank, as the case may be, can be evacuated through the auxiliary valve 33, via the communication passage or orifice 48 which brings the fresh air duct 9 into communication with the interior of the valve mouth 3 through the auxiliary valve 33.

Figures 9, 10:
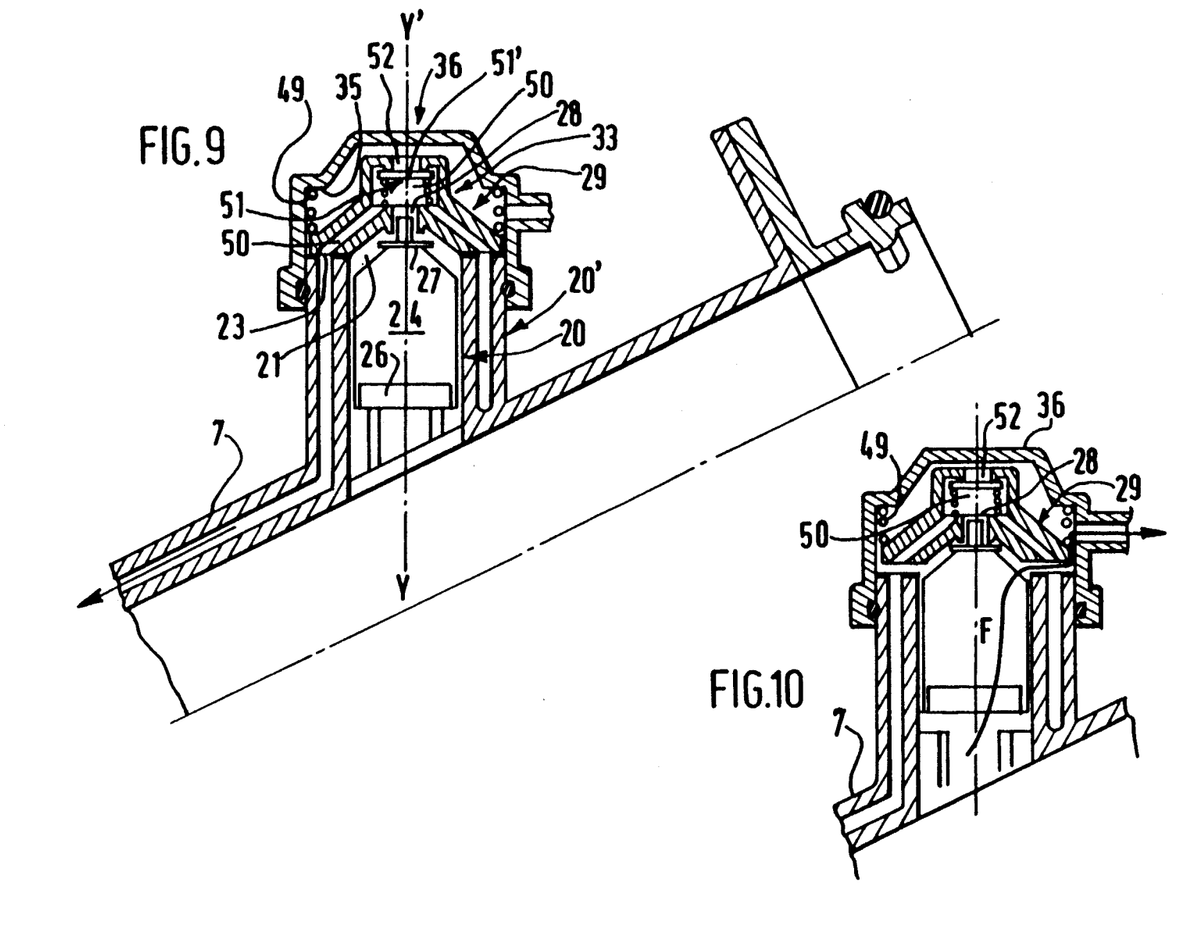
FIG. 9 is a view in cross section showing part of the filling pipe with a venting device in a fourth embodiment of the invention, being a third variant on the version shown in FIG. 3.
FIG. 10 is a view identical with that of FIG. 9, and shows the venting device in a working state.

Reference will now be made to FIGS. 9 and 10, which show a further embodiment, in which the neck portion 20 again carries a valve member 24 having the float 26 and valve surface 27. The scavenging duct 7 again runs along the wall 16 of the valve mouth 3 and along the wall 22 of the neck portion 20, to terminate in its open end 23.

However, in the arrangement shown in FIGS. 9 and 10, the seating member 29 of the safety valve 8 itself carries the orifice 28, and is mounted movably over the opening 21 and the open end 23 of the duct 7. The seating member 29 is seated over the opening 21 and open end 23 by means of a spring 49, which bears on the periphery of the seating member and on the base 35 of the cap 36, so as to surround the seating member. The latter is therefore sealingly held against the end of the wall 22 of the neck portion 20 and the wall of the scavenging duct 7. The cap 7 carries the fresh air duct 9 between the seating member 29 and the base 35.

As shown in FIGS. 9 and 10, the neck portion 20 is coaxially surrounded by, and spaced away from, a second neck portion 20', which (like the neck portion 20) projects from the wall 16, and which has an opening in the same plane as the opening 21 of the neck portion 20.

The space between the two neck portions 20 and 20' is connected to the part of the scavenging duct 7 that runs along the wall 16, and the open upper end of this space, again lying in the plane of the opening 21 of the neck portion 20, constitutes the upper open end of the upper part of the scavenging duct 7. Thus the cap 7 has a circular shape surrounding the safety valve 8 and sealingly secured on to the wall of the outer neck portion 20'.

The seating member 29 has a first orifice 28 which is concentric with the valve member 24. This first orifice 28 is continued in a chamber 50 which contains an under-pressure valve 51. The valve 51 has a valve member 51' which cooperates with an orifice 52 for bringing the chamber 50 into communication with the outside atmosphere through the fresh air duct 9.

In addition, the seating member 29 has a communication passage 31 which brings the chamber 50 and the outer end of the scavenging duct 7 into communication with each other.

In this embodiment the outer end 23 is annular. The seating member 29 associated with the under-pressure valve 51 here constitutes the auxiliary valve 33, responsive to under-pressure or over-pressure.

The operation of this embodiment will be described only with respect to the case where the scavenging duct 7 is obstructed and/or the valve member 24 is seated against the orifice 28 so as to close the latter.

In the event of over-pressure occurring in the fuel tank, the pressure within the inner neck portion 20 will be such that it exerts a thrust on the seating member 29, thus raising the latter upwardly against the spring 49 (see FIG. 10). This causes air to flow towards the fresh air duct, as indicated in FIG. 10 by the arrow F, and towards the scavenging duct 7 if the latter is not obstructed.

By contrast, if the scavenging duct is obstructed, with the valve member 24 engaged on the end stop elements 25, the orifice 28 then being open, and if at the same time the pressure in the fuel tank is reduced, then the under-pressure valve 51 will be actuated so as to admit air from outside into the interior of the pipe mouth 3 via the fresh air duct 9, the orifice 52, the chamber 50 and the orifice 28.

Figure 11:
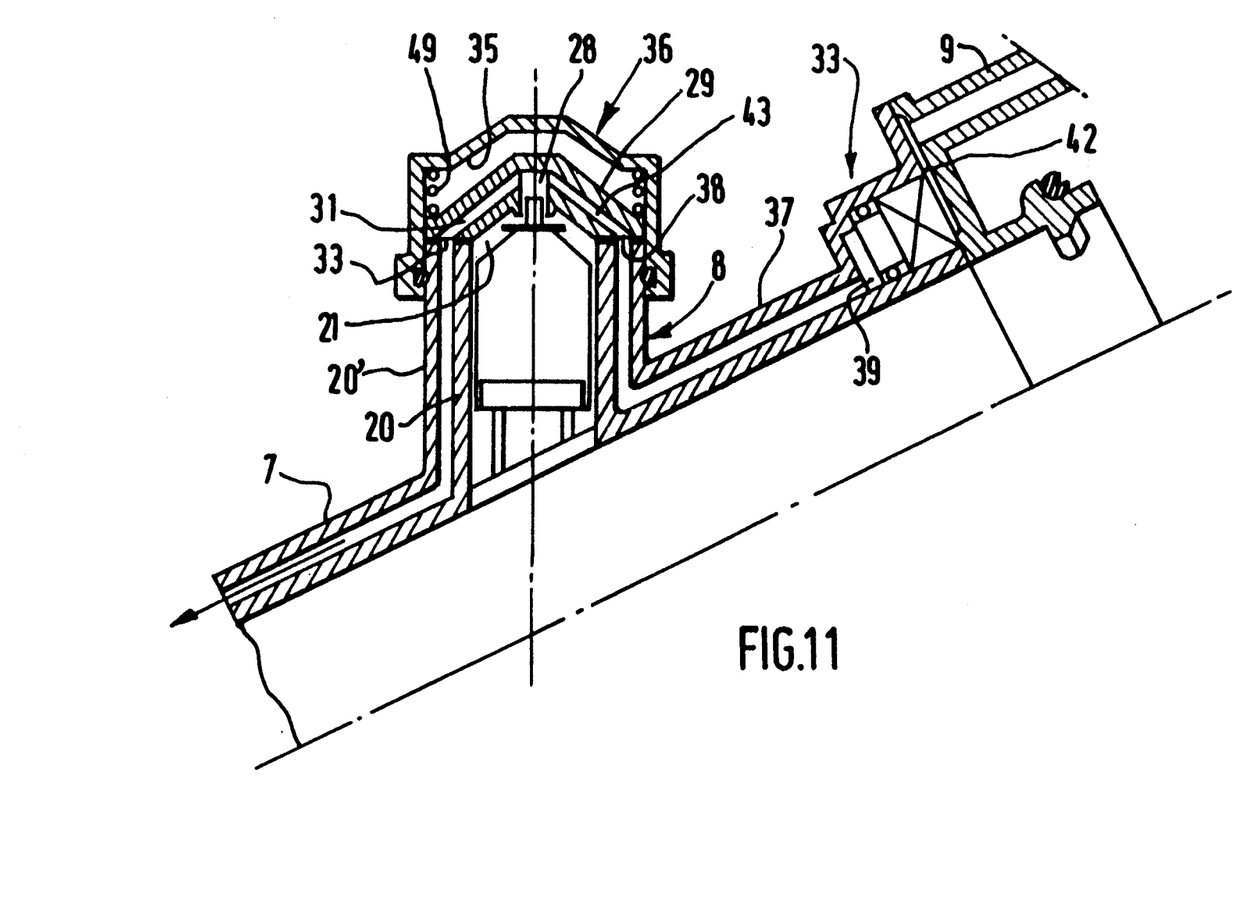
FIG. 11 is a view in cross section showing part of the filling pipe with a venting device in a fifth embodiment of the invention, being a fourth variant of the embodiment shown in FIG. 3.

The embodiment shown in FIG. 11 is a combination of those shown in FIGS. 5 and 6 and FIGS. 9 and 10. In the arrangement shown in FIG. 11, the pipe mouth 3 carries the safety valve 8, the end of the scavenging duct 7, the supplementary duct 37 (as already described), the auxiliary valve 33, and the fresh air duct 9 as in FIGS. 5 and 6.

The seating member 29 of the safety valve 2 has an orifice 28 which is blind at one end. The seating member 29 lies sealingly over the opening 21 and the open ends 33 and 38 of the scavenging duct 7 and supplementary duct 37 respectively. The seating member 29 is held in engagement by means of a spring 49, which bears on the periphery of the seating member 29 and on the base 35 of the cap 36 which envelops the end of the inner neck portion 20 and the two ducts 37 and 7. In the same way as has already been mentioned, in a variant the neck portion 20 can of course be surrounded by a further neck portion 20', so as to define between them a circular space which is connected to the ducts 7 and 37 running along the wall 16. The seating member 29 has only a single orifice 26, which is brought into communication with the scavenging duct 7 through a passage 31, and with the supplementary duct 37 through a passage 43.

In operation, in the event of an under-pressure or over-pressure occurring in the fuel tank, and if the scavenging duct 7 is blocked, air will be admitted or evacuated by flowing through the fresh air duct 9, the communication passage 42, the valve 33, the open end 39 of the duct 37, the duct 37 itself, the communication passage 43, and the orifice 28. In addition, if the valve surface 27 remains seated on the orifice 28 so as to close the latter, any over-pressure that may occur in the fuel tank will cause the seating member 29 to rise, so that the excess pressure is evacuated via the supplementary duct 37 to the auxiliary valve 33. In this particular embodiment, the main function of the auxiliary valve 33 is assumed by the seating member 29, which acts as the over-pressure release valve.

Figures 12, 13:
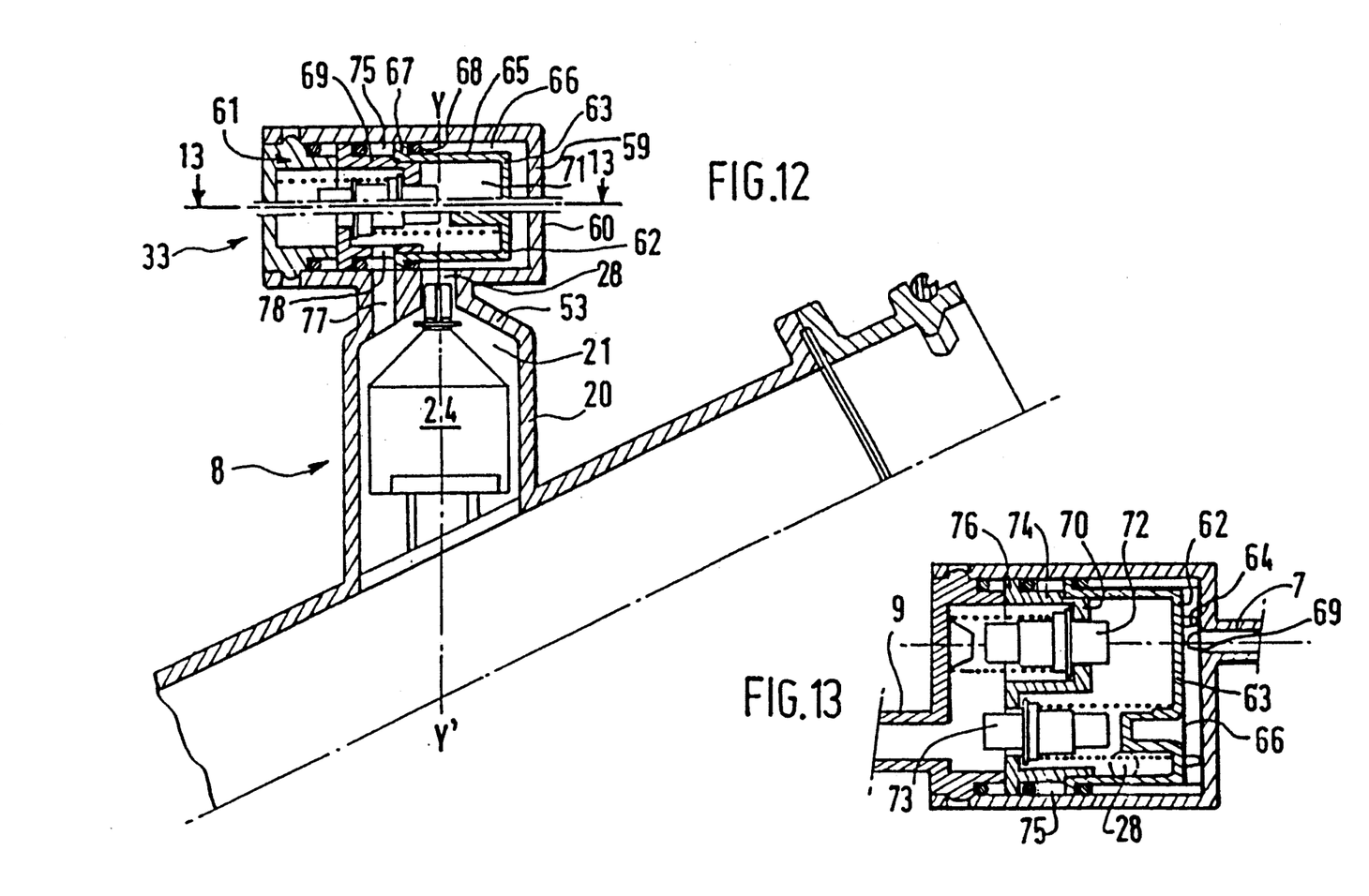
FIG. 12 is a view in cross section showing part of the filling pipe with a venting device in a sixth embodiment of the invention, being a fifth variant on the embodiment shown in FIG. 3.
FIG. 13 is a view in cross section, taken on the line 13—13 in FIG. 12.

Referring now to FIGS. 12 and 13, the neck portion 20 here has a head wall 53 defining its opening 21 and carrying the orifice 28, the latter being again concentric with the valve member 24. Beyond this head wall 53, and integral with the latter, there extends upwardly a generally cylindrical housing 59, disposed at right angles to the axis YY' of the safety valve 8. This is the housing for the auxiliary valve 33 in this example, and it has a base wall 60 and an open end 61.

Within the valve housing 59, there is mounted a first hollow member 62, which is U-shaped in cross section and which has a shape complementary to the internal shape of the housing 59. The member 62 has a base 63 which is spaced away from the base wall 60 of the housing by means of projections 64 (FIG. 13). The base 63 extends towards the open end 61 of the housing in a side wall 65, which is spaced radially away from the side wall of the housing 59, so as to define between them a free passage 66. The passage 66 is determined by the free space between the base wall 60, the base 63 and the free space between the side walls of the hollow member 62 and the housing 59. The passage 66 is sealingly closed towards the open end 61 by means of an external radial collar 67, which projects from the side wall 65 and engages on the inner surface of the side wall of the housing 59 and against a sealing ring 68.

The passage 66 is in communication firstly with the scavenging duct 7, through an orifice provided in the base wall 60 of the housing 59, and secondly with the interior of the neck portion 20 through the orifice 28. A second hollow member 69 is carried coaxially within, and forms effectively an extension of, the first hollow member 62. The second hollow member 69 bears on the collar 67 of the hollow member 62 through its end portion 70. The end portion 70 is in the form of an inverted "S" in longitudinal cross section. A free space 71 is thus defined between the tease of the hollow member 62 and the end portion 70 of the hollow member 69.

In the hollow of the "S", the second hollow member 69 carries an over-pressure valve 72 and an under-pressure valve 73. The end portion 70 of the hollow member 69 is extended towards the open end 61 of the housing by a side wall 74 which is spaced radially away from the side wall of the housing 59, so as to define between them a free passage 75. The passage 75 is delimited firstly by these two side walls and secondly by the collar of the first hollow member 62 and a further collar 76. The collar 76 is carried by the side wall 74 of the second hollow member 69. The passage 75 is sealed by the collar 76 and a sealing ring.

The passage 75 communicates firstly with the interior of the neck portion 20, through an orifice 77 which is formed in the head wall 59 of the neck portion 20 in line with the passage 75, and secondly with the space 71 between the two hollow members 62 and 70, via an orifice 78 formed in the side wall 74 of the hollow member 69.

Finally, a third hollow member 79, which acts as an end closure member for the open end 61 of the housing 59, is arranged coaxially with the other two hollow members 62 and 69, so as to close the housing sealingly. As shown in FIG. 13, in this embodiment the fresh air duct 9 is carried by this third hollow member 79.

The operation of this embodiment of the venting system for the fuel tank is as follows. Under normal conditions, fuel vapour is removed, and over-pressure or under-pressure within the fuel tank are corrected, through the safety valve 8 and the scavenging duct 7. The appropriate flow of air and/or vapour takes place through the orifice 28, the passage 66 and the scavenging duct 7.

In the event of the valve surface 27 being seated against its seating, so as to close the orifice 28, any fuel vapour will be removed, and over-pressures occurring in the fuel tank will be corrected, by flow, this time, through the orifice 77, the passage 75, the orifice 78, the space 71, the over-pressure and under-pressure valves 72 and 73, and the fresh air duct 9.

If the scavenging duct 7 is blocked, fuel vapours will be removed, and/or over-pressures and under-pressures corrected, in the fuel tank, in exactly the same way.

It will be understood that all the different embodiments of the safety valve and auxiliary valve described herein may of course be used even when a scavenging duct is not provided in the filling system, for example as has been described above with reference to FIG. 2. This will now be explained in greater detail with reference to the variants shown in FIGS. 14 to 17.

Figures 14, 15:
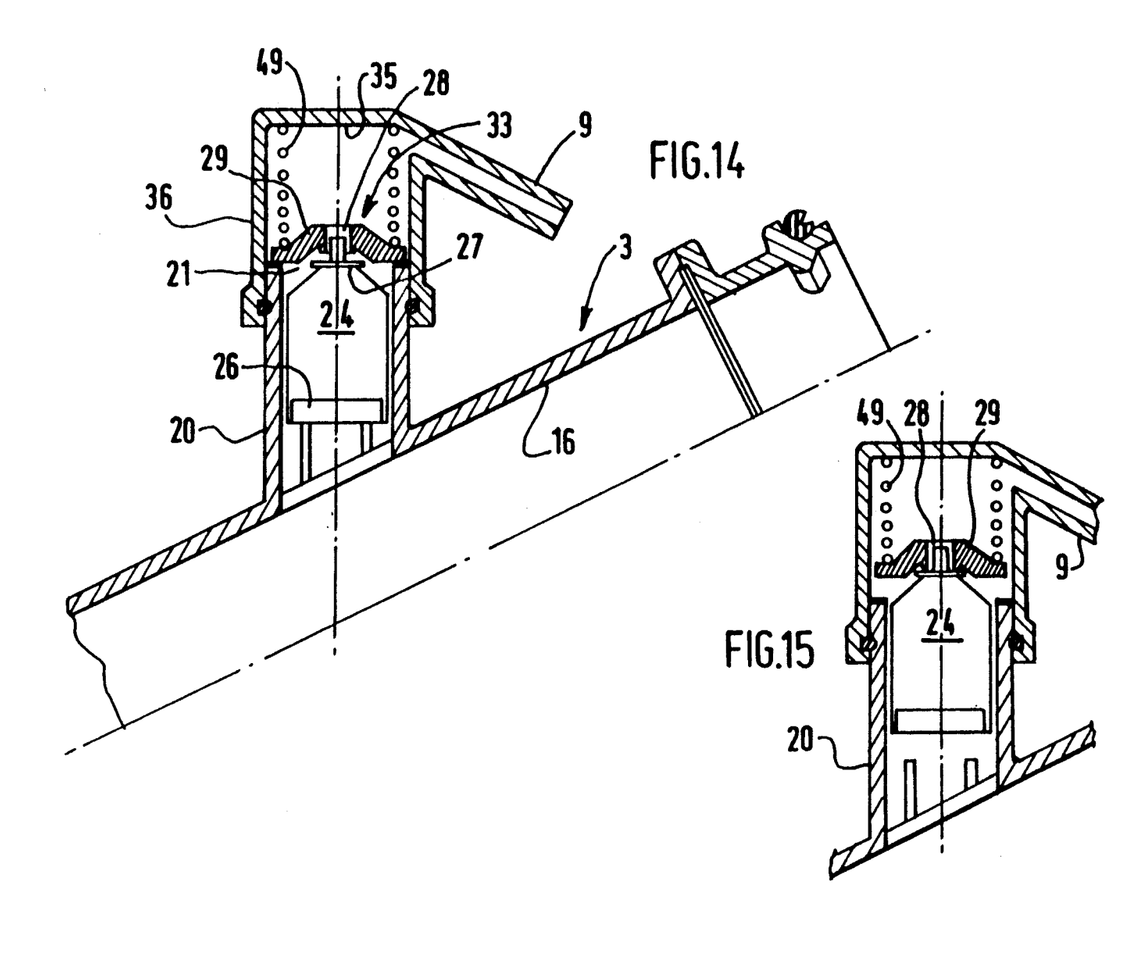
FIGS. 14 and 15 are views in cross section showing part of the filling pipe in relation to FIG. 2, having a venting device in accordance with the invention.

In FIGS. 14 and 15, a pipe mouth 3 is shown which includes a cylindrical wall 16. A valve member 24 is contained in the neck portion 20 and is provided with a float 26 and a valve surface 27, all as previously described with reference to FIG. 3.

A movable valve seating 29 is carried on the top of the neck portion 20, so as to overlie the opening 21 within the latter. The seating 29 has an orifice 28 which is concentric with the valve member 014, and is held in place over the opening 21 by a spring 49, which bears firstly on the periphery of the seating 29 and secondly on the base 35 of the cap 36, which carries a fresh air duct 9 between the base of the cap 36 and the seating 29. The cap 36 is sealingly fixed on the neck portion 20, and has an inner periphery which is spaced from the circumferential edge of the seating 29. In the same way as has already been described, the valve member 24 has the main function of preventing fuel, surging from the fuel tank, from passing through the orifice 28 and the duct 9, while at the same time allowing correction of over-pressures or under-pressures in the fuel tank to be achieved by appropriate flow through the orifice 28 and the fresh air supply duct 9, while also permitting the evacuation of any fuel vapours from the system.

As can be seen in FIG. 15, when the valve member 24 lies seated on the seating 29 so as to close the orifice 28, any over-pressure that may occur in the fuel tank can be evacuated through the fresh air supply duct 9. To this end, the pressure subsisting inside the neck portion 20 must be sufficient to exert a force against the action of the spring 49, in such a way as to raise the seating 29 and thus free the opening 21. so that the air or fuel vapours can pass between the inner periphery of the cap 36 and the side edge of the seating 29, thence being evacuated through the fresh air supply duct 9. The auxiliary valve 33 is therefore defined, in this example, by the seating 29 and the associated spring 49.

Figure 16:
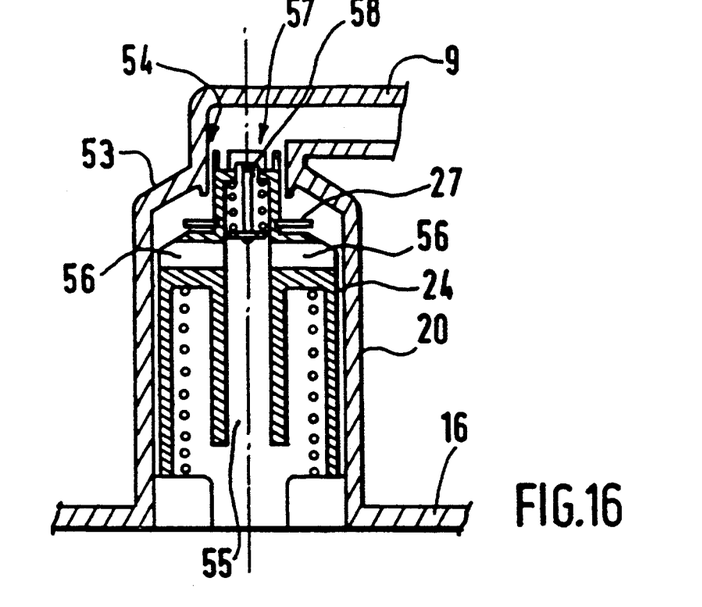
FIGS. 16 and 17 are views in cross section showing part of the filling pipe with a venting device in a further embodiment which is a variant on the embodiment shown in FIG. 14.
Figure 17:
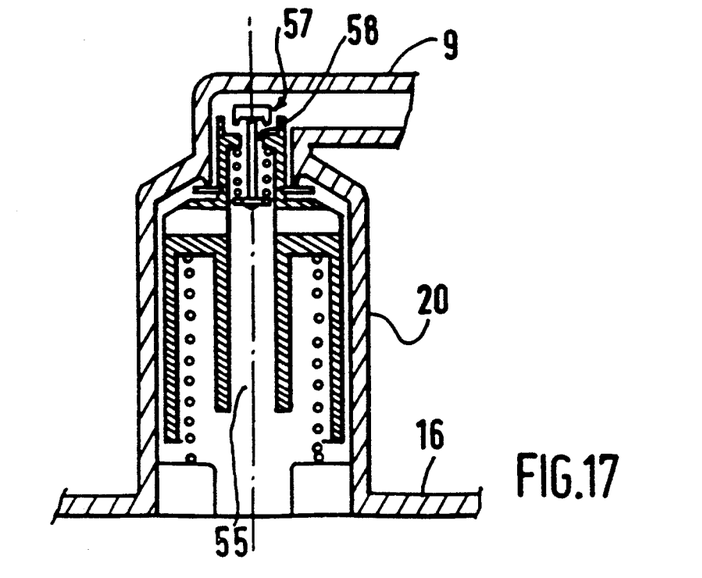

Reference will now be made to FIGS. 16 and 17, which show a further modified embodiment of the filling system. In FIGS. 16 and 17, the cylindrical neck portion 20 has a head wall 53 in which is formed a coaxial orifice 54, which connects the interior of the neck portion 20 directly with the fresh air duct 9, which is made integral with the head wall 53. A valve member 24, mounted inside the neck portion 20, has a valve surface 27 for closing the orifice 54.

The valve member 24 is formed with a coaxial internal spigot having a bore 55, which extends on either side of the level of the valve surface 27 and continues below the latter. The valve member 24 also has two radial ports 56 which connect the bore 55 with the interior of the neck portion 20. Mounted within the bore 55, generally above the level of the valve surface 27, is an auxiliary valve 57. The valve member 24 has an orifice 58 which terminates the bore 55 at the upper end of the valve member, so as to bring the fresh air duct 9 into communication with the bore 55. The auxiliary valve 57 is calibrated so as to be responsive to over-pressure and/or under-pressure, and is arranged to control the opening and closing of the orifice 58.

In normal operation, an excess or deficiency in the pressure within the fuel tank is relieved, and fuel vapours are evacuated into the fresh air duct 9 via the bore 55, the ports 56 and the orifice 54. However, in the situation which has already been described, in which the valve surface 27 lies against its seating defined by the head wall 53 (so closing the orifice 54), any excess or deficiency of pressure in the fuel tank can be corrected by action of the auxiliary valve 57, which thus enables the interior of the fuel tank to be brought into communication with the fresh air duct 9 via the orifice 58 and the bore 55, as is shown in FIG. 17.

The present invention is not limited to the various embodiments described above, which are given only as preferred examples; the invention does embrace within its scope any other variant within the competence of the person skilled in the art.

What is claimed is:

1. A system for filling the tank of a motor vehicle with fuel and for venting fuel vapor comprising:
   a filling pipe with a neck portion connected to said tank and an open end,
   means for selectively closing and sealing the open end,
   duct means and valve means joined to said neck portion, said duct means capable to discharge excess fuel to atmosphere and cooperating with said valve means to define a passage for continuously venting said tank while said filling pipe end is closed,
   said valve means including a safety valve portion which is in the open position during normal operation for interconnecting the tank through said duct means to atmosphere and an auxiliary valve portion responsive to failure of said safety valve portion, for ensuring uninterrupted tank venting in the event said safety valve portion is in the closed position,
   wherein said duct means includes a gas vent duct,
   a fuel having an inlet and an outlet, said inlet communicating with the tank and the filling pipe neck portion and said outlet communicating with said fresh air duct,
   said safety valve portion responding to fuel surging into the filling pipe by changing to the closed position so as to prevent escape of fuel while the vehicle is operated and said auxiliary valve portion allowing the correction of pressure differences between tank interior and outside air, said auxiliary valve portion continuing the correction during failure of the safety valve portion to return to the open position.

* * * * *